US012424890B2

(12) United States Patent
Ma et al.

(10) Patent No.: US 12,424,890 B2
(45) Date of Patent: Sep. 23, 2025

(54) ELECTRIC POWER TOOL, MOTOR, AND ROTOR THEREOF

(71) Applicant: JOHNSON ELECTRIC INTERNATIONAL AG, Murten (CH)

(72) Inventors: Quantong Ma, Shenzhen (CN); Mingwai Chau, Hong Kong (CN); Allan Madrid, Hong Kong (CN); Anping Zhao, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 383 days.

(21) Appl. No.: 17/959,270

(22) Filed: Oct. 3, 2022

(65) Prior Publication Data

US 2023/0031766 A1 Feb. 2, 2023

Related U.S. Application Data

(63) Continuation of application No. PCT/CN2021/080437, filed on Mar. 12, 2021.

(30) Foreign Application Priority Data

Apr. 7, 2020 (CN) .......................... 202010266848.4

(51) Int. Cl.
*H02K 1/2786* (2022.01)
*H02K 7/00* (2006.01)

(52) U.S. Cl.
CPC ........... *H02K 1/2786* (2013.01); *H02K 7/003* (2013.01)

(58) Field of Classification Search
CPC ...... H02K 1/27; H02K 1/2791; H02K 1/2786; H02K 5/20; H02K 5/207; H02K 7/003; H02K 9/06

USPC ....................... 310/156.12, 156.26
See application file for complete search history.

(56) References Cited

U.S. PATENT DOCUMENTS

| 4,883,982 A | 11/1989 | Forbes et al. |
| 2007/0236099 A1* | 10/2007 | Kim ..................... H02K 15/095 |
| | | 310/180 |
| 2019/0334409 A1 | 10/2019 | Dib et al. |

FOREIGN PATENT DOCUMENTS

| CN | 101087077 A | 12/2007 |
| CN | 101170266 A | 4/2008 |
| CN | 102687378 A | 9/2012 |
| CN | 102751802 A | 10/2012 |

(Continued)

OTHER PUBLICATIONS

Machine Translation of EP_1897209_B1 (Year: 2011).*

(Continued)

*Primary Examiner* — Alexander A Singh
*Assistant Examiner* — Charlie Frank Mann, Jr.
(74) *Attorney, Agent, or Firm* — Aird & McBurney LP

(57) ABSTRACT

The invention provides a power tool, a motor and a rotor thereof. The rotor includes a housing, a rotating shaft fixed on the housing, a yoke accommodated in the housing, and permanent magnets mounted on the yoke. The housing includes a bottom wall and a sidewall extending from an outer periphery of the bottom wall in an axial direction of the rotor. The rotor further includes a cooling fan, the cooling fan is located at an axial distal end of the sidewall away from the bottom wall. The rotating shaft, the yoke, the permanent magnets, the cooling fan and the housing are formed into a non-detachable whole by overmolding.

12 Claims, 7 Drawing Sheets

(56) References Cited

FOREIGN PATENT DOCUMENTS

| | | | | |
|---|---|---|---|---|
| CN | 204704151 U | 10/2015 | | |
| CN | 107516958 A | 12/2017 | | |
| CN | 209233661 U | 8/2019 | | |
| CN | 110679065 A | 1/2020 | | |
| CN | 110784129 A | 2/2020 | | |
| CN | 110829654 A | 2/2020 | | |
| DE | 10258346 A1 * | 6/2004 | ........... | H02K 1/2786 |
| EP | 1560316 A2 * | 8/2005 | .............. | F02N 11/00 |
| EP | 1897209 B1 * | 8/2011 | ......... | F04D 25/0633 |
| FR | 3004025 A1 | 10/2014 | | |

OTHER PUBLICATIONS

Machine Translation of DE_10258346_A1 (Year: 2004).*
Machine Translation of EP_1560316_A2 (Year: 2005).*
English translation of International Search Report from corresponding PCT application No. PCT/CN2021/080437 Jun. 11, 2021.
European Search Report from corresponding EP Application No. 21785560.0 Apr. 22, 2024.

* cited by examiner

ELECTRIC POWER TOOL, MOTOR, AND ROTOR THEREOF

CROSS REFERENCE TO RELATED APPLICATIONS

This non-provisional patent application is continuation application of PCT Application No. PCT/CN2021/080437, filed with the Chinese Patent Office on Mar. 12, 2021, which claims priority to Chinese Patent Application No. 202010266848.4, filed on Apr. 7, 2020, all of which are incorporated herein by reference in their entirety.

FIELD OF THE INVENTION

The present invention relates to the field of electric technology, and in particular, to rotors, motors having the rotors, and power tools having the motors.

BACKGROUND OF THE INVENTION

An outer rotor motor includes a rotor and a stator disposed within the rotor. The stator includes an iron core and windings wound on the iron core. The rotor generally includes a casing, a yoke mounted on the casing, permanent magnets mounted on the yoke, and a rotating shaft connected to the casing. When the motor is running, the windings of the stator will generate a lot of heat. If the heat is not discharged in time, it will affect the service life and performance of the motor. For this reason, in prior arts, a cooling fan or cooling fan blades are usually installed at an axial end of the casing, and ventilation openings are opened at the same time, so as to help heat dissipation. However, this design inevitably increases the assembly process and material cost of the motor, and the cooling effect is poor.

SUMMARY OF THE INVENTION

In view of this, the present invention aims to provide a rotor, a motor having the rotor, and a power tool having the motor that can solve or at least alleviate the above-mentioned problems.

For this purpose, the present invention provides a rotor, which comprises a housing, a rotating shaft fixed on the housing, a yoke accommodated in the housing, and permanent magnets mounted on the yoke, the housing comprises a bottom wall and a sidewall extending from an outer periphery of the bottom wall in an axial direction of the rotor, the rotor further comprises a cooling fan, the cooling fan is located at an axial distal end of the sidewall away from the bottom wall, the rotating shaft, the yoke, the permanent magnets, the cooling fan and the housing are formed into a non-detachable whole by overmolding.

In some embodiments, the bottom wall of the housing defines air inlets, and an airflow enters the housing of the rotor through the air inlets, and then is discharged from a radially outer side of the cooling fan.

In some embodiments, the cooling fan comprises a first connecting ring and a second connecting ring spaced apart in the axial direction, and a plurality of blades connected between the first connecting ring and the second connecting ring, and adjacent blades are spaced apart to define air outlets.

In some embodiments, the first connecting ring is located at the axial distal end of the housing of the rotor, and is formed by an axial end face of the side wall of the housing.

In some embodiments, extension directions of the blades are inclined relative to radial directions of the housing.

In some embodiments, the bottom wall comprises a plurality of radial connecting portions arranged in radial directions, and adjacent radial connecting portions are spaced apart to define the air inlets.

In some embodiments, the bottom wall further comprises a spacing ring, the spacing ring is coaxial with the side wall and arranged in the bottom wall, and is connected to radial middle sections of the connecting portions, so that the air inlets are spaced in plural in radial directions.

In some embodiments, the rotating shaft comprises a shaft portion and a connecting portion integrally extending radially outward from the shaft portion, the connecting portion and the housing are integrally connected by overmolding.

In some embodiments, a plurality of ribs extending radially toward the shaft portion are provided on the connecting portion of the rotating shaft, and the ribs are at least partially encased and fixed in the bottom wall of the housing.

In some embodiments, the rotating shaft is made of carbon structural steel by cold forging process.

The present invention further provides a motor, comprises a stator and the rotor above, the stator is arranged in the rotor, and the rotor is rotatable relative to the stator.

In some embodiments, windings of the stator are located between the bottom wall of the housing and the cooling fan in the axial direction.

The present invention further provides a power tool comprises the motor above.

The rotor provided by the embodiment of the present invention has a simple structure, is easy to produce, and has a good cooling effect, and the number of components of the rotor assembly is reduced, the assembly is convenient, and the manufacturing cost is effectively reduced.

Figure 1:
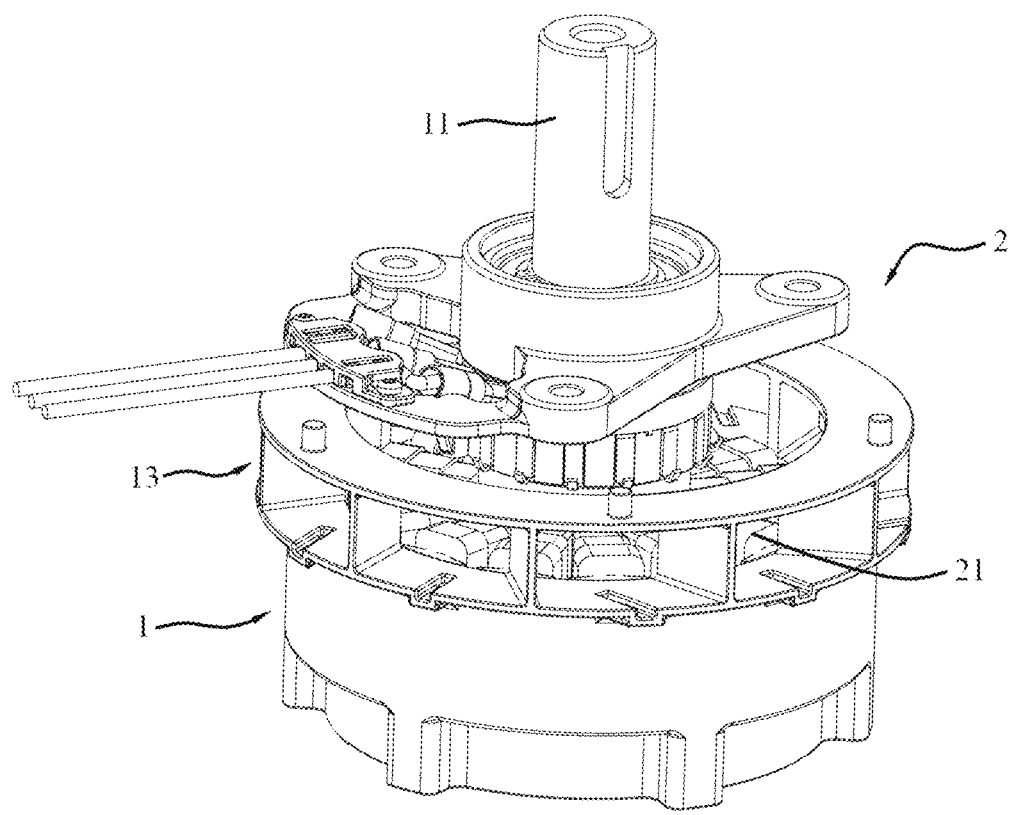
FIG. 1 shows an assembled, perspective view of a motor according to an embodiment of the present invention.

Reference numerals: 100—motor; 1—rotor; 11—rotating shaft; 111—shaft portion; 112—connecting portion; 113—rib; 114—fixing reinforcement; 115—axial groove; 116—axial hole; 12—housing; 120—sidewall; 121—bottom wall; 122—annular groove; 123—radial connecting portion; 124—first pillar; 125—notch; 126—protruding post; 127—positioning recess; 128—through hole; 129—second pillar; 191—spacing ring; 192—support portion; 193—through opening; 13—cooling fan; 130—blade; 131—air inlet; 132—air outlet; 133—first connecting ring; 134—second connecting ring; 14—yoke; 141—body portion; 142—first installation groove; 143—opening; 144—second installation groove; 145—inner protrusion; 146—outer protrusion; 147—magnetic pole; 148—pole face; 15—permanent magnet; 16—annular connecting piece; 161—inner hole; 162— outer hole; 163—protruding flange; 164—through slot; 165—cutout; 2—stator; 21—stator core; 22—windings; 23—wire holder; 24—bearing; 25—bracket; 300—power tool.

DETAILED DESCRIPTION OF THE PREFERRED EMBODIMENTS

Hereinafter, the present invention will be described in detail with reference to the accompanying drawings and specific embodiments, so as to make the technical solutions and beneficial effects of the present invention clearer. It can be understood that the drawings are only provided for reference and explanation, and are not used to limit the present invention. The dimensions shown in the drawings are only for the convenience of clear description, and do not limit the proportional relationship.

FIG. 1 shows a combined perspective view of a motor 100 according to an embodiment of the present invention. The motor 100 includes a rotor 1 and a stator 2 accommodated in the rotor 1. The stator 2 is fixedly arranged, and the rotor 1 can rotate relative to the stator 2. In this embodiment, the motor 100 is a brushless DC motor.

Figure 2:
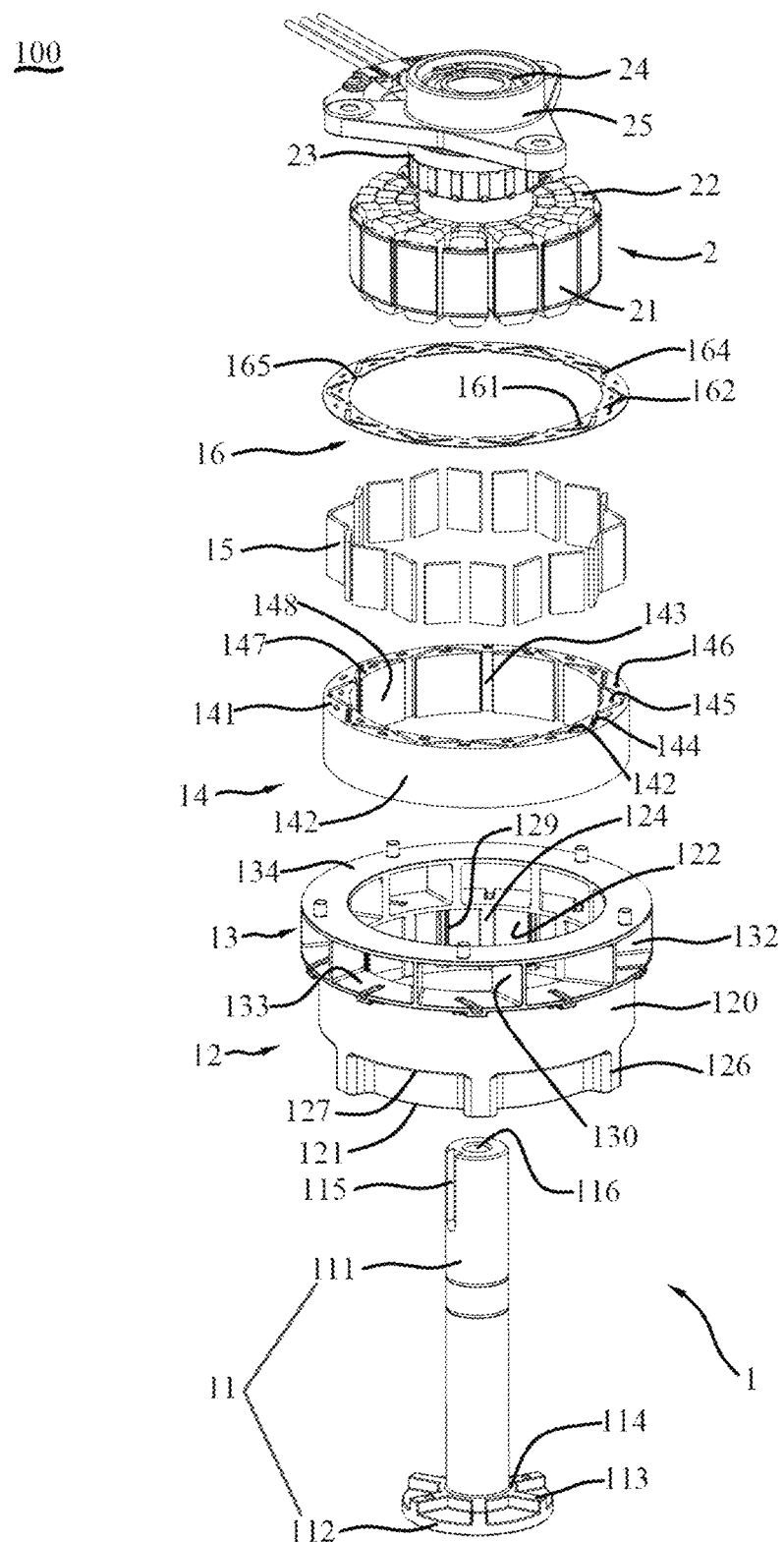
FIG. 2 shows an exploded perspective view of the motor of FIG. 1.
Figure 3:
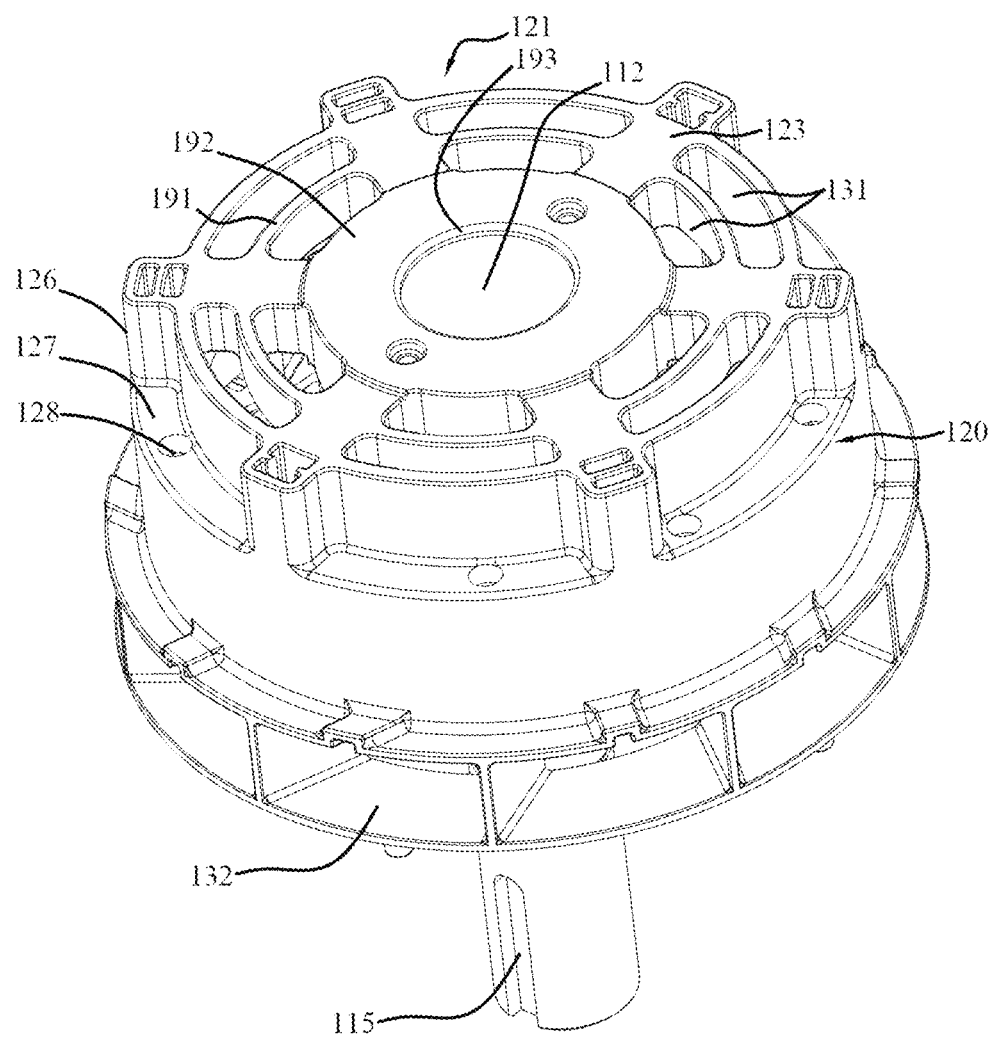
FIG. 3 shows a perspective view of a rotor of the motor of FIG. 1.
Figure 4A:
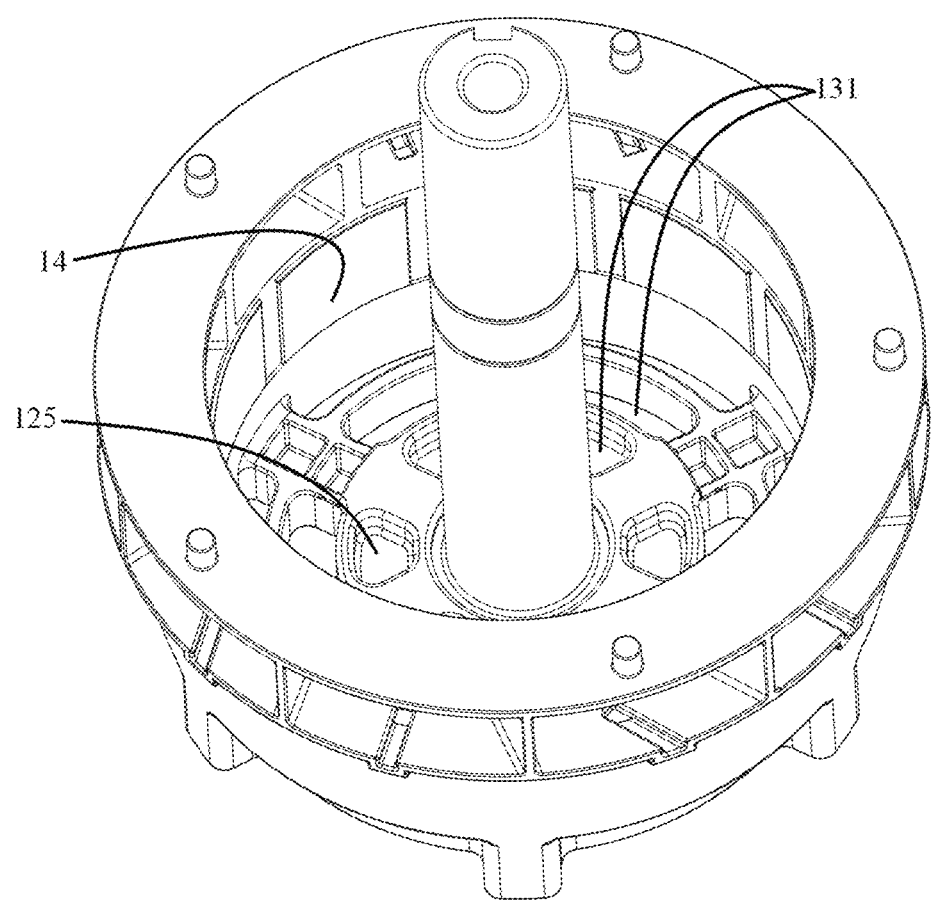
FIG. 4a shows a perspective view of the rotor of FIG. 3 from another aspect.
Figure 4B:
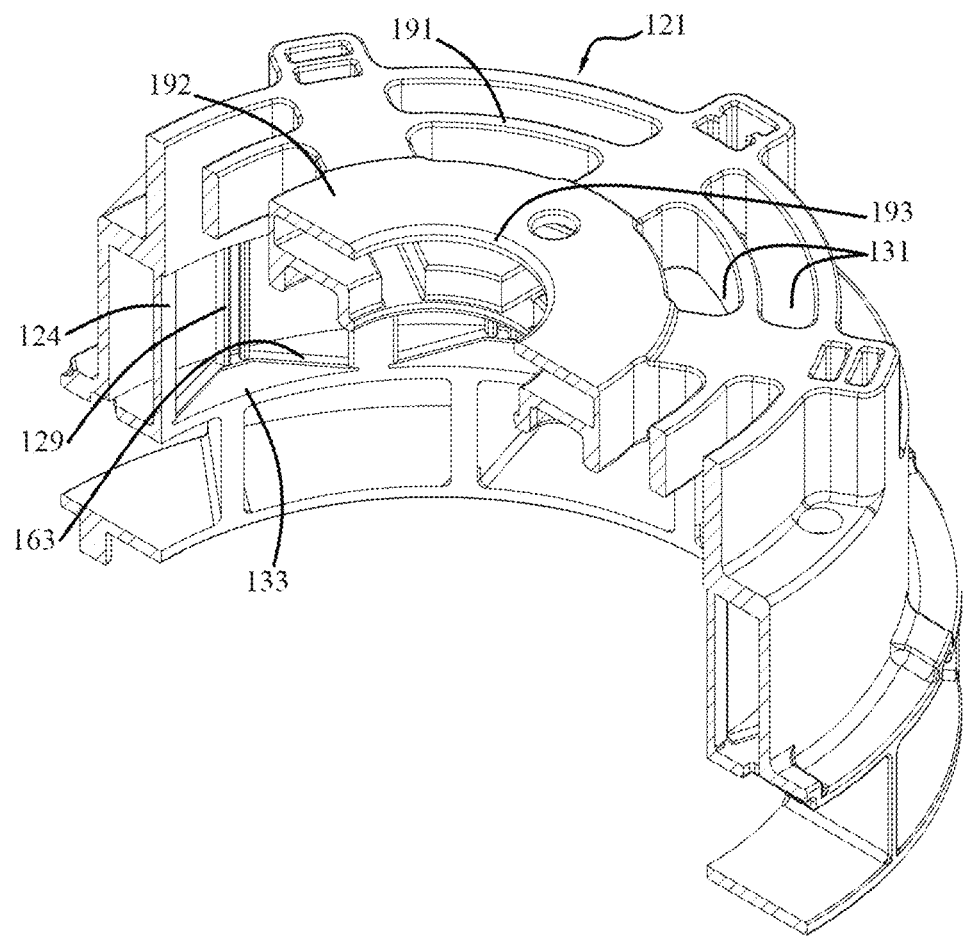
FIG. 4b shows an axial cross-sectional view of the rotor of FIG. 4a, in which a rotating shaft, a yoke and permanent magnets are omitted.
Figure 5:
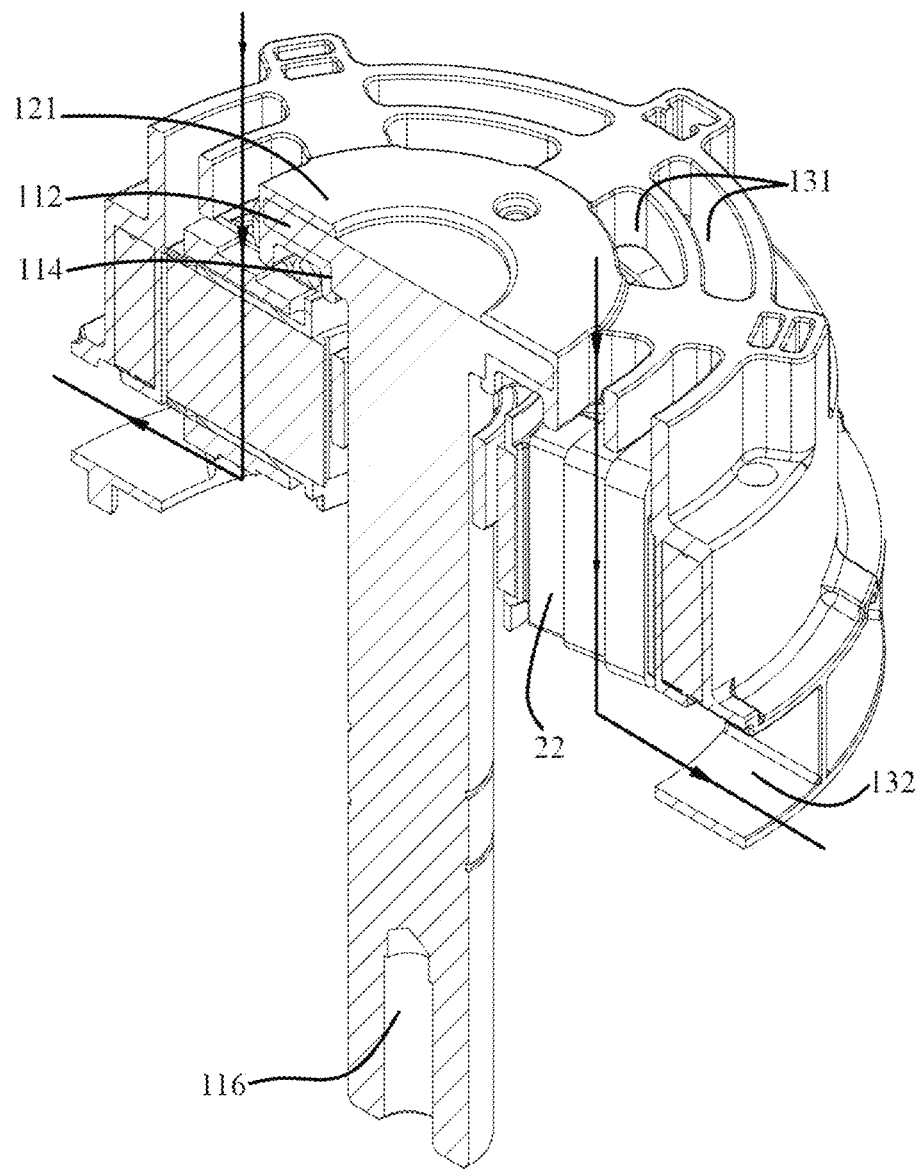
FIG. 5 shows a perspective cross-sectional view of the rotor of FIG. 3 assembled with a stator.

Referring also to FIG. 2, the rotor 1 includes a housing 12, a rotating shaft 11 fixedly connected to the housing 12, a yoke 14 accommodated in the housing 12, and permanent magnets 15 mounted on the yoke 14. The stator 2 includes a bracket 25, a stator core 21 and a wire holder 23 fixed to the bracket 25, and windings 22 wound on the stator core 21. The bracket 25 is used to fix the motor 100 to a suitable component or position. The stator core 21 and the wire holder 23 are fixed relative to each other. The rotating shaft 11 of the rotor 1 is rotatably supported in the bracket 25 of the stator 2 through a bearing 24, so that the rotor 1 can rotate relative to the stator 2. Referring to FIGS. 3 to 5 at the same time, the rotor 1 further includes a cooling fan 13 disposed on the housing 12. The rotor 1 is integrally formed by overmolding. Specifically, the housing 12 and the cooling fan 13 of the rotor 1 are injection-molded from plastic, at the same time, during the injection molding process, the rotating shaft 11, the yoke 14 and the permanent magnets 15 are integrally with the housing 12 and the cooling fan 13 by means of overmolding to form a non-detachable whole. In alternative embodiments, the cooling fan 13 may be attached to housing 12. The housing 12 is substantially in the shape of a hollow column with one end open. In this embodiment, the housing 12 includes a bottom wall 121 and a sidewall 120 axially extending from an outer periphery of the bottom wall 121. The yoke 14 and the permanent magnets 15 are embedded in the sidewall 120 by overmolding. The cooling fan 13 is annular, and is disposed at an axial distal end of the sidewall 120 away from the bottom wall 121.

The cooling fan 13 includes a first connecting ring 133 and a second connecting ring 134 spaced apart in the axial direction, and a plurality of blades 130 connected between the two connecting rings 133 and 134. Wherein, the first connecting ring 133 is located at an axial distal end of the sidewall 120 of the housing 12 of the rotor 1, which may be formed by an axial end face of the sidewall 120. The second connection ring 134 is arranged parallel to and spaced from the first connection ring 133. The blades 130 are evenly arranged in the circumferential direction between the two connecting rings 133 and 134, and adjacent blades 130 are spaced apart to define airflow channels (or air outlets 132). Two axial ends of the blades 130 are respectively connected with the two connecting rings 133 and 134. Each blade 130 extends from outer peripheral edges toward inner peripheral edges of the first connecting ring 133 and the second connecting ring 134, but in this embodiment, an extension direction of the blade 130 is inclined relative to the radial direction of the housing 12, and the inclination directions of all the blades 130 are substantially the same.

In this embodiment, the outer diameter of the cooling fan 13 is larger than the outer diameter of the housing 12, that is, the outer diameters of the first connecting ring 133 and the second connecting ring 134 are larger than the outer diameter of the housing 12. The inner diameter of the cooling fan 13 is substantially equal to the inner diameter of the housing 12.

The bottom wall 121 of the housing 12 includes a plurality of radial connecting portions 123 extending in radial directions. The radial connecting portions 123 are connected to the sidewall 120. The plurality of radial connecting portions 123 are arranged at intervals in the circumferential direction, and adjacent radial connecting portions 123 are spaced apart to form an air inlet 131 therebetween. In this embodiment, the bottom wall 121 further includes a spacing ring 191, the spacing ring 191 is arranged in the bottom wall 121 coaxially with the sidewall 120, and is connected with radial middle sections of all the radial connecting portions 123. Thereby, the air inlets 131 are spaced in plural in the radial direction. When the stator 2 is assembled in the housing 12 of the rotor 1, the cooling fan 13 on the housing 12 at least partially exceeds the windings 22 of the stator 2 in the axial direction of the housing 12, so that the windings 22 are located between the bottom wall 121 of the housing 12 and the cooling fan 13 in the axial direction. The air inlets 131 of the housing 12 is arranged corresponding to the windings 22. The windings 22 are arranged between the air inlets 131 and the air outlets 132 of the cooling fan 13 so that the windings 22 are completely placed in a cooling area. As shown in FIG. 5, when the rotor 1 is running, under the action of the cooling fan 13, the airflow flows into the housing 12 from the air inlets 131, passes through the energized windings 22, and then flows out from the air outlets 132, so that the windings 22 can be better and fully cooled.

The rotating shaft 11 is a one-piece structure, and includes a shaft portion 111 and a connecting portion 112 integrally extending radially outward from one end of the shaft portion 111. The rotating shaft 11 is integrally fixed in the housing 12 through the connecting portion 112. The connection portion 112 is at least partially wrapped at a center of the bottom wall 121 of the housing 12. Specifically, the center of the bottom wall 121 has a support portion 192 for supporting the connecting portion 112 of the rotating shaft 11, so that the rotating shaft 11 is overmolded at the bottom wall 121 of the housing 12. In this embodiment, a center of the support portion 192 has a through opening 193, and an outer surface of the connecting portion 112 of the rotating shaft 11 is exposed through the through opening 193. Preferably, a plurality of protruding ribs 113 are provided on an inner surface of the connecting portion 112 of the rotating shaft 11 to further strengthen the connecting and fixing of the rotating shaft 11 in the housing 12. The ribs 113 are at least partially encased in the bottom wall 121 to prevent rotation of the rotating shaft 11 relative to the housing 12. Preferably, the ribs 113 are radially arranged on the connecting portion 112 and extend radially inward to an outer circumference of the shaft portion 111. In this embodiment, a fixing reinforcement 114 arranged in a circumferential direction is provided between the ribs 113 and the shaft portion 111 to reinforce the ribs 113 and the shaft portion 111 and the connection therebetween. The fixing reinforcement 114 is wrapped in the bottom wall 121. Optionally, the fixing reinforcement 114 may protrude from the bottom wall 121. The outer diameter of the fixing reinforcement 114 on the connecting portion 112 is slightly larger than the outer diameter of the shaft portion 111, which enhances the bending resistance and torsion resistance of the rotating shaft 11. In this embodiment, the bottom wall 121 is further provided with a plurality of notches 125 between the ribs 113 to reduce the mass of the housing 12 without affecting the stability of the rotating shaft 11 on the bottom wall 121.

The shaft portion 111 is provided with an axial groove 115 at an outer circumference of the other end thereof, and an axial hole 116 is defined in the center of the other end. The axial slot 115 and the axial hole 116 are used to connect with a desired tool such as a load to drive the load of the required tool rotation. Preferably, the rotating shaft 11 is made of No. 45 steel (carbon structural steel, SWRCH45K) by cold forging process. A diameter of the shaft portion 111 is 25 mm, and the connecting portion 112 is preferably circular with a diameter of 60 mm. Using the cold forging process to process the rotating shaft 11 avoids the powder metallurgy parts processing technology used in the prior art, thereby saving costs and ensuring the strength of the rotating shaft 11. The shaft portion 111 and the connecting portion 112 are integrally formed by the cold forging process of the rotating shaft 11, thereby saving cost and simplifying the assembly of the rotating shaft 11.

In this embodiment, the yoke 14 is integrally embedded and accommodated in the sidewall 120 of the housing 12. In order to more clearly show the specific structures of the yoke 14 and the housing 12, FIG. 2 shows the disassembled state of the yoke 14 and the housing 12, but in fact, since the housing 12 is overmolded outside the yoke 14, the two form an inseparable whole. Specifically, as shown in the figures, the yoke 14 has a hollow cylindrical shape. The sidewall 120 of the housing 12 defines an annular groove 122 surrounding the stator core 21 in a position corresponding to the stator core 21 of the stator 2. In the present embodiment, the annular groove 122 is arranged below the cooling fan 13. The yoke 14 is received in the annular groove 122 of the housing 12. An outer side of the sidewall 120 of the housing 12 is provided with protruding posts 126 extending radially outward and corresponding to the annular groove 122. The protruding posts 126 are designed for the passage of fluid plastic during the injection molding process. A positioning recess 127 is defined between each two adjacent protruding posts 126. A through hole 128 is defined in a bottom of the positioning recess 127, and the through hole 128 communicates with the annular groove 122. The positioning recesses 127 and the through holes 128 are provided for positioning an applicable support body during the injection molding process, thereby supporting and positioning the yoke 14 during the overmolding process.

The yoke 14 includes a body portion 141 and a plurality of magnetic poles 147 connected to the body portion 141, and the plurality of magnetic poles 147 are distributed at intervals along the circumferential direction and inside the body portion 141. An inner side of the body portion 141 includes a plurality of V-shaped grooves, and each magnetic pole 147 forms a connection with the body portion 141 in a corresponding V-shaped groove. In this embodiment, each magnetic pole 147 is substantially triangular. Each magnetic pole 147 is spaced apart from opposite sides of a corresponding V-shaped groove to define a first installation groove 142 and a second installation groove 144. The first installation groove 142 and the second installation groove 144 are arranged in a V-shape. Permanent magnets 15 with the same polarity are accommodated in the first installation groove 142 and the second installation groove 144, so that after the permanent magnets 15 are embedded in the first installation groove 142 and the second installation groove 144, a pole face 148 between the two installation grooves 142, 144 is magnetized into one magnetic pole, and the magnetic pole arranged in this way can significantly improve the magnetic concentration effect, thereby improving the power density of the motor 100. In this embodiment, the permanent magnets 15 are rectangular. Two adjacent magnetic poles 147 are spaced apart to define an opening 143. As a result, a larger magnetoresistance can be generated, thereby reducing magnetic flux leakage. The body portion 141 of the yoke 14 is positioned in the housing 12 via the openings 143. During the overmolding process of the housing 12 and the yoke 14, first pillars 124 are formed on an inner side of the annular groove 122 at positions corresponding to the openings 143 to engage with the openings 143. Thereby, the body portion 141 is fixed in the circumferential and radial directions. In this embodiment, during the overmolding process, second pillars 129 are formed in the annular groove 122 that can be engaged in the first installation grooves 142 and the second installation grooves 144 to enhance the connection strength between the housing 12 and the yoke 14. The second pillars 129 are integrally formed by injection molding, and fixe the permanent magnets 15 in the first installation grooves 142 and the second installation grooves 144 without any gap.

Preferably, a top of the yoke 14 is connected to an annular connecting piece 16. The annular connecting piece 16 can be fixedly connected to the yoke 14 in a manner of snap fit, thereby the yoke 14 is fixed in the axial direction. For example, an inner protrusion 145 may be provided at a top of each magnetic pole 147, and an outer protrusion 146 may be provided at a top of the body portion 141 between each two adjacent magnetic poles 147. The annular connecting piece 16 defines inner and outer through holes 161 and 162 for the inner and outer protrusions 145 and 146 to pass through. A connection between the yoke 14 and the annular connecting piece 16 is realized by the snap fit of the protrusions 145, 146 and the through holes 161, 162. Referring to FIGS. 2 and 4b at the same time, the annular connecting piece 16 is provided with through slots 164. During the overmolding process, a side of the first connecting ring 133 of the cooling fan 13 facing the housing 12 is formed with protruding flanges 163 that are snapped into the through slots 164, so as to realize a connection between the housing 12 and the annular connecting piece 16, and thereby realizing a fixing connection between the housing 12 and the yoke 14. In this embodiment, the annular connecting piece 16 is further provided with cutouts 165 corresponding to the openings 143 between adjacent magnetic poles 147.

The rotor 1 of the present invention is formed by overmolding, and when the housing 12 and the cooling fan 13 are formed, the one-piece rotating shaft 11 with the shaft portion 111 and the connecting portion 112, the yoke 14 and the permanent magnets 15 are connected as a whole at the same time, so that the manufacture of the rotor 1 is simpler and the cost is lower.

Figure 6:
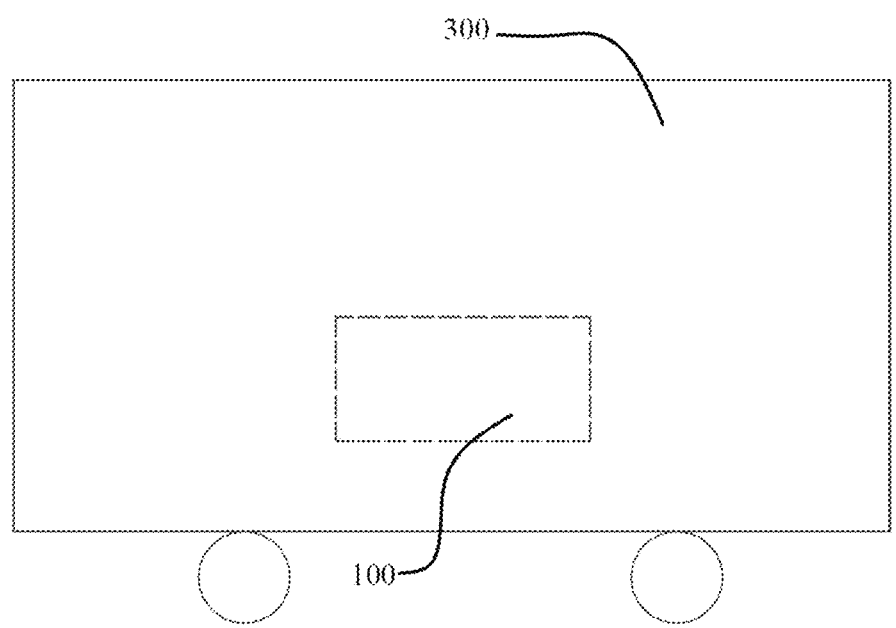
FIG. 6 shows a schematic diagram of a power tool according to an embodiment of the present invention.

FIG. 6 shows a power tool 300 having the motor 100 of the present invention, which may be, for example, a lawn mower, and the motor 100 is used for mowing and driving a lawn mower's mowing equipment. The motor 100 of the present invention can also be used for other power tools.

The above are only preferred specific implementations of the present invention. The protection scope of the present invention is not limited to the above-listed examples. Any person skilled in the art can obviously obtain the technology within the technical scope disclosed in the present invention. Simple changes or equivalent replacements of the solutions fall within the protection scope of the present invention.

The invention claimed is:

1. A rotor, comprising:
   a housing comprising a bottom wall and a sidewall extending from an outer periphery of the bottom wall in an axial direction of the rotor;
   a rotating shaft fixed on the housing;
   a yoke accommodated in the housing;
   permanent magnets mounted on the yoke; and
   a cooling fan located at an axial end of the sidewall away from the bottom wall, wherein the rotating shaft, the yoke, the permanent magnets, the cooling fan and the housing are formed into a non-detachable whole by overmolding, and wherein the rotating shaft is a one-piece structure and comprises a shaft portion and a connecting portion integrally extending radially outward from the shaft portion, the connecting portion and the housing are integrally connected by overmolding.

2. The rotor according to claim 1, wherein the bottom wall of the housing defines air inlets, and an airflow enters the housing of the rotor through the air inlets, and then is discharged from a radially outer side of the cooling fan.

3. The rotor according to claim 2, wherein the cooling fan comprises a first connecting ring and a second connecting ring spaced apart in the axial direction, and a plurality of blades connected between the first connecting ring and the second connecting ring, and adjacent blades are spaced apart to define air outlets.

4. The rotor according to claim 3, wherein the first connecting ring is located at the axial distal end of the housing of the rotor, and is formed by an axial end face of the side wall of the housing.

5. The rotor according to claim 3, wherein extension directions of the blades are inclined relative to radial directions of the housing.

6. The rotor according to claim 2, wherein the bottom wall comprises a plurality of radial connecting portions arranged in radial directions, and adjacent radial connecting portions are spaced apart to define the air inlets.

7. The rotor according to claim 6, wherein the bottom wall further comprises a spacing ring, the spacing ring is coaxial with the side wall and arranged in the bottom wall, and is connected to radial middle sections of the connecting portions, so that the air inlets are spaced in plural in radial directions.

8. The rotor according to claim 1, wherein a plurality of ribs extending radially toward the shaft portion are provided on the connecting portion of the rotating shaft, and the ribs are at least partially encased and fixed in the bottom wall of the housing.

9. The rotor according to claim 1, wherein the rotating shaft is made of carbon structural steel by cold forging process.

10. A motor, comprising:
    a stator; and
    a rotor rotatably arranged outside the stator, the rotor comprising a housing, a rotating shaft fixed on the housing, a yoke accommodated in the housing, and permanent magnets mounted on the yoke, the housing comprising a bottom wall and a sidewall extending from an outer periphery of the bottom wall in an axial direction of the rotor, the rotor further comprising a cooling fan located at an axial end of the sidewall away from the bottom wall, wherein the rotating shaft, the yoke, the permanent magnets, the cooling fan and the housing are formed into a non-detachable whole by overmolding, and wherein the rotating shaft is a one-piece structure and comprises a shaft portion and a connecting portion integrally extending radially outward from the shaft portion, the connecting portion and the housing are integrally connected by overmolding.

11. The motor according to claim 10, wherein windings of the stator are located between the bottom wall of the housing and the cooling fan in the axial direction.

12. A power tool, comprises the motor according to claim 10.

* * * * *